United States Patent
Friedlander et al.

(10) Patent No.: US 10,742,664 B2
(45) Date of Patent: Aug. 11, 2020

(54) PROBABILISTICALLY DETECTING LOW-INTENSITY, MULTI-MODAL THREATS USING SYNTHETIC EVENTS

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); Jeb Linton, Manassas, VA (US); Christopher M. Poulin, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 14/887,999

(22) Filed: Oct. 20, 2015

(65) Prior Publication Data
US 2017/0111376 A1    Apr. 20, 2017

(51) Int. Cl.
*H04L 9/00* (2006.01)
*G06F 21/00* (2013.01)
*H04L 29/06* (2006.01)

(52) U.S. Cl.
CPC ...... *H04L 63/1416* (2013.01); *H04L 63/1441* (2013.01)

(58) Field of Classification Search
CPC ............... H04L 63/1408; H04L 63/145; H04L 63/1416; H04L 63/1441; H04L 63/1425; H04L 63/14
See application file for complete search history.

(56) References Cited

U.S. PATENT DOCUMENTS

| | | |
|---|---|---|
| 6,484,203 B1 | 11/2002 | Porras et al. |
| 8,055,603 B2 | 11/2011 | Angell et al. |
| 8,145,582 B2 | 3/2012 | Angell et al. |
| 8,799,269 B2 | 8/2014 | Friedlander et al. |
| 8,903,813 B2 | 12/2014 | Friedlander et al. |
| 9,654,485 B1* | 5/2017 | Neumann ........... H04L 63/1416 |
| 2005/0222811 A1 | 10/2005 | Jakobson et al. |
| 2013/0104236 A1 | 4/2013 | Ray et al. |
| 2014/0358952 A1 | 12/2014 | Adams et al. |
| 2016/0269434 A1* | 9/2016 | DiValentin ......... H04L 63/1408 |
| 2016/0294854 A1* | 10/2016 | Parthasarathi ......... H04L 63/20 |

(Continued)

OTHER PUBLICATIONS

Myers, J. et al.; "Insider Threat Detection Using Distributed Event Correlation of Web Server Logs"; Proceedings of the 5th International Conference on Information Warfare and Security, pp. 251-258,; 2010.

(Continued)

*Primary Examiner* — Alexander Lagor
(74) *Attorney, Agent, or Firm* — Tutunjian & Bitetto, P.C.; Anthony Curro (57) ABSTRACT

Methods and systems for event detection include defining a plurality of conditions that represent one or more synthetic events. Data from a plurality of data sources is aggregated across a period of time, multiple attack surfaces, and geographically distinct locations. The aggregated data is matched to the conditions to determine whether a synthetic event has occurred. A response to the synthetic event is formed to resist an attack.

15 Claims, 6 Drawing Sheets

(56) References Cited

U.S. PATENT DOCUMENTS

2016/0301704 A1* 10/2016 Hassanzadeh ...... H04L 63/0209
2017/0032130 A1* 2/2017 Joseph Durairaj ... G06F 21/552

OTHER PUBLICATIONS

Internet Society RFCS et al.; "OAuth2.0 Threat Model and Security Considerations" An IP.com Prior Art Database Technical Disclosure; http://ip.com/IPCOM/000224830; Jan. 8, 2013.
Anonymously; "Network Asset Activity Profiling"; An IP.com Prior Art Database Technical Disclosure; http://ip.com/IPCOM/000221591; Sep. 13, 2012.

* cited by examiner

PROBABILISTICALLY DETECTING LOW-INTENSITY, MULTI-MODAL THREATS USING SYNTHETIC EVENTS

BACKGROUND

Technical Field

The present invention relates to enterprise security and, more particularly, to detecting multi-modal threat events against extended enterprises.

Description of the Related Art

Detecting and preventing attacks on computer infrastructure grows ever more challenging, as enterprise networks span around the globe. All outwardly facing computing systems face a background noise of attacks made up largely by automated systems searching for common vulnerabilities. Conventional attack detection looks for high-intensity patterns of attacks against a single site and can recognize deviations from the common background noise of attacks.

However, conventional tools are severely limited in their scope. They are generally implemented at a single site or network, whereas large enterprise organizations may span many sites worldwide across a variety of different networks. As a result, an attack may be distributed across the organization's many exposed surfaces, with the attacks against any single site being too low in intensity to be detected by conventional tools.

SUMMARY

A method for event detection includes defining a plurality of conditions that represent one or more synthetic events. Data from a plurality of data sources is aggregated across a period of time, multiple attack surfaces, and geographically distinct locations. The aggregated data is matched to the conditions using a processor to determine whether a synthetic event has occurred. The synthetic event is responded to, to resist an attack.

A method for event detection includes defining a plurality of conditions that represent one or more synthetic events. The conditions include one or more binary conditions and one or more probabilistic conditions. Data from a plurality of data sources is aggregated across a period of time, multiple attack surfaces, and geographically distinct locations. The aggregated data is matched to the conditions using a processor to determine whether a synthetic event has occurred by calculating a score based on each of the plurality of conditions and comparing the score to a detection threshold. A severity is assigned to the synthetic event based on a number of synthetic events detected. The synthetic event is responded to, to resist an attack, based on the severity of the synthetic event.

A system for event detection includes an event analysis module that has a processor configured to aggregate data from a plurality of data sources across a period of time, multiple attack surfaces, and geographically distinct locations, to match the aggregated data to a plurality of conditions that represent one or more synthetic events, and to determine whether a synthetic event has occurred. A response module is configured to respond to the synthetic event to resist an attack.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention aggregate information across multiple sites within an organization and across time to detect "synthetic events," defined as a set of conditions on the many aggregated events. The present embodiments thereby reduce the large amount of data to a manageable number of synthetic events, making the analysis of data from across the entire enterprise tractable.

A synthetic event is an additive or non-additive aggregate of information, identified as one or several values that reflect the reduction of the data. In one particular embodiment, the synthetic event is a set of conditions that occur together in the mass of collected data. The conditions representing a synthetic event may be set manually, according to known attack patterns, or may instead by learned automatically by, e.g., clustering, machine learning, and artificial neural networks. The conditions that make up a synthetic event may be weighted by how recent a constituent event was, how frequently it occurs, and how material the event is (e.g., how dangerous the type of attack is). Synthetic events may furthermore be formed from multiple other synthetic events, providing a further distillation of the attack's signal.

The synthetic events may furthermore incorporate information that is not typically collected in attack detection. For example, if an organization has taken a position against a person, company, or government, a sensitivity to attacks from the offended party may be increased. Toward this end, data may be collected from news sources or entered manually by human operators. Generally, synthetic events include all of the elements, both technical and non-technical, that are expected from an event. These events may be detected by security information event management software, may be collected from the internet through, e.g., automated searches and machine learning, or may be entered manually by a user. Fields may include, for example, a time/date stamp, a text description of the event, a specification of the systems attacked, an originating IP address and/or domain name, geographic regions of the attacker and the targets, a confidence rating, a category of attack (e.g., malware infection, port scan, denial of service, etc.), and indicators of compromise (for example in a Structured Threat Information eXpression (STIX) format).

Synthetic events thereby aggregate data both horizontally (i.e., across different locations and data sources) and vertically (i.e., along the time dimension). The synthetic events can therefore be used as a kind of fingerprint for an attack that captures information from a large field.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
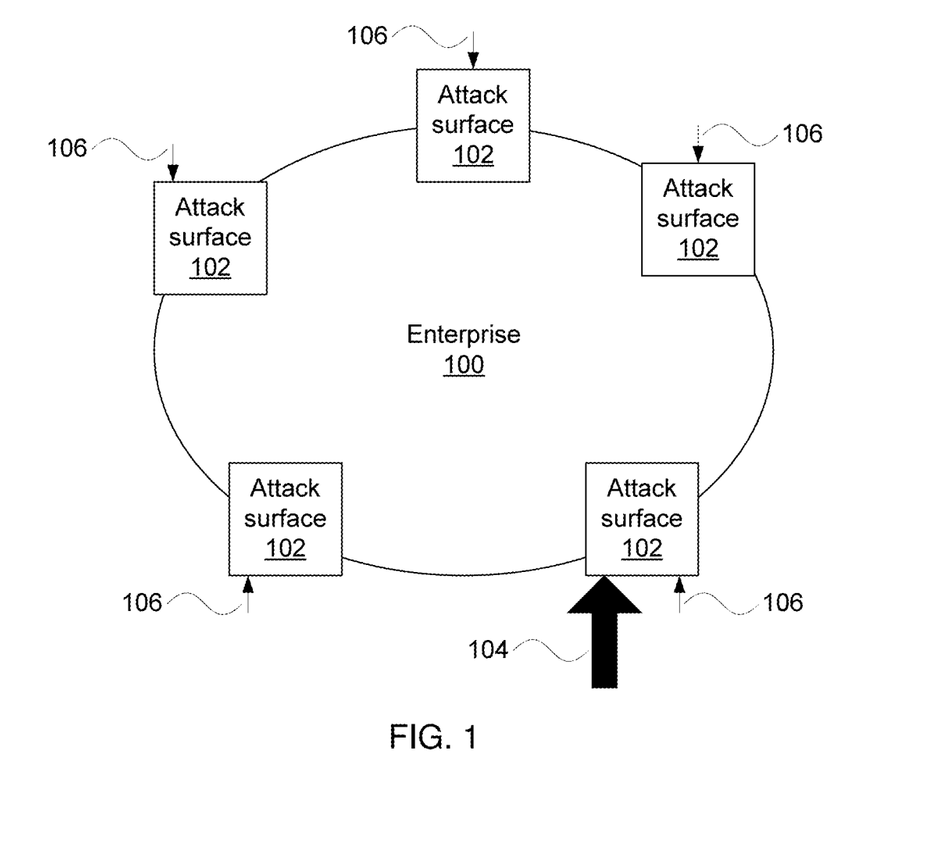
FIG. 1 is a diagram of a concentrated attack in accordance with the present principles.

Referring now to the drawings in which like numerals represent the same or similar elements and initially to FIG. 1, an attack on an enterprise 100 is shown. The enterprise 100 includes multiple attack surfaces 102. These attack surfaces 102 may represent different servers on a network, different surfaces on a single machine, different virtual private networks, different geographical locations, etc., and may also include different services within a specific system, such as a database system, an email account, a network router, etc. Each attack surface 102 receives an expected number of low-intensity attacks 106—the digital equivalent of a thief checking for unlocked doors in a parking lot. In this case, a high-intensity attack 104 is directed to one attack surface 102. This high-intensity attack is likely to be detected, as it stands out from the expected environment.

Figure 2:
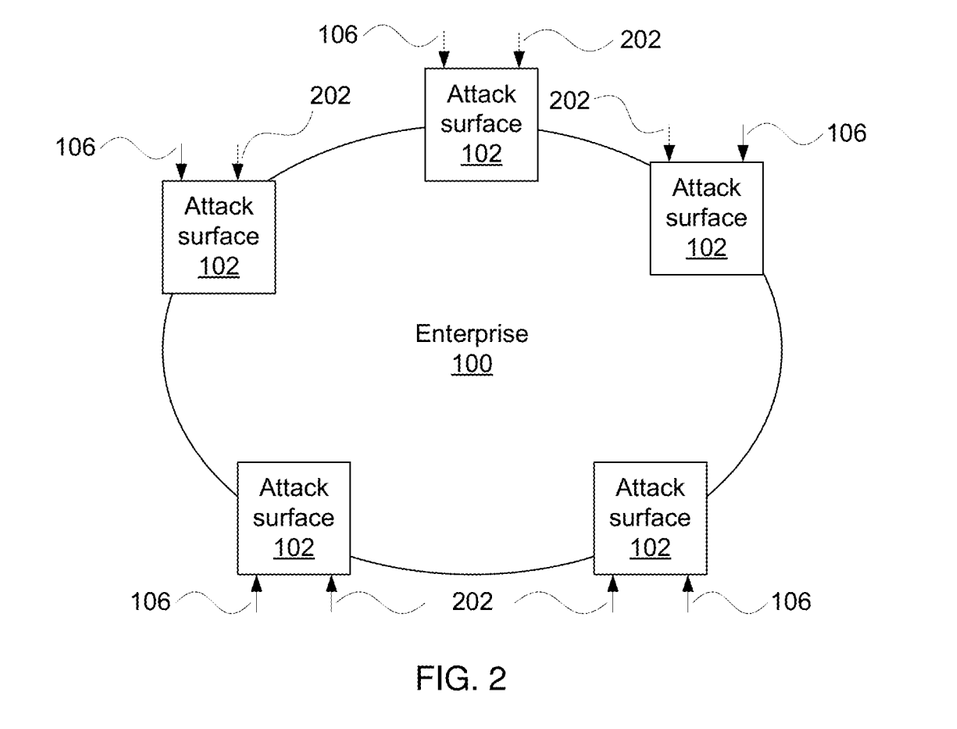
FIG. 2 is a diagram of a low-intensity attack in accordance with the present principles.

Referring now to FIG. 2, a second attack on the enterprise 100 is shown. As in this first case, the attack surfaces 102 experience a background level of low-intensity attacks 106 at all times. In this case, however, the targeted attack 202 is distributed across the different attack surfaces 102. The attack 202 may thereby be spread out over both attack surfaces 102 and time, such that the intensity at any given attack surface 102 never rises to a level that would be detected by conventional tools. The present embodiments, however, recognize the various targeted attacks 202 against the different attack surfaces 102 as being smaller parts of a larger pattern—parts of a synthetic event.

Figure 3:
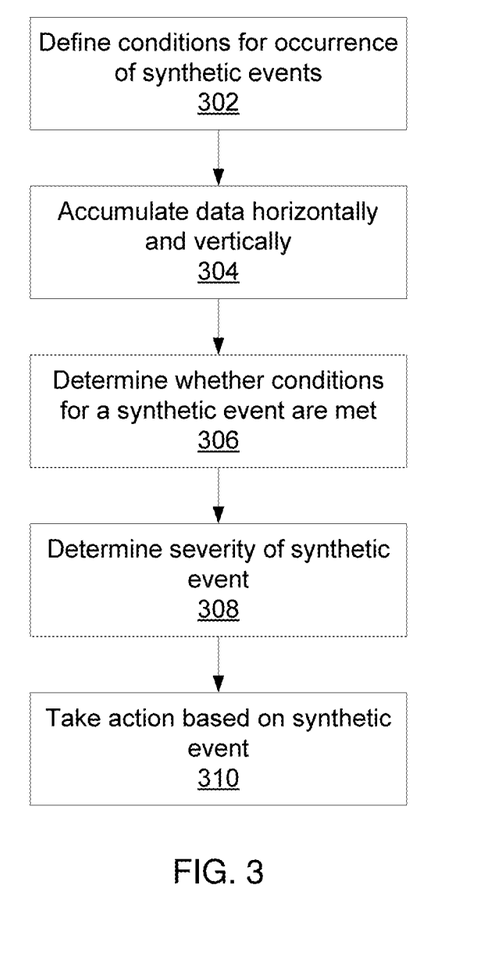
FIG. 3 is a block/flow diagram of a method for event detection in accordance with the present principles.

Referring now to FIG. 3, a method of using synthetic events to detect attacks is shown. Block 302 defines the conditions for occurrence of synthetic events. As noted above, each synthetic event may be expressed a set of conditions on the dataset. If all of the conditions are met, the occurrence of a synthetic event may be recorded. In particular, it should be recognized that the conditions will include event points that may occur at different locations or at different times and may be substantially different in kind.

One specific type of condition is a deviation from background levels. For example, one kind of attack attempts to access open ports on a system and tries common username and password combinations. Even if the credentials discovered are limited in their authority, once access is achieved, other exploits may be levied to escalate privileges within the system. These attacks are very common, and every server on the internet is exposed to multiple such attacks in a day as attackers scan looking for easy prey. However, a concerted attack may result in thousands of such attacks in the space of hours. This is easy to detect locally at a single site. However, by spreading the attack across many sites, the attackers can remain below detection thresholds by remaining within "noise" levels.

The synthetic levels thereby provide a way to detect such deviations from the background noise attacks by considering such attacks on a wide scale. Whereas, with conventional detection tools, an attacker might successfully levy an attack against a large system by limiting the intensity of their attacks to any given point, a synthetic event that includes a condition for detecting similar attacks close in time across different sites would nevertheless detect the activity.

For example, consider an attack that included an attempted SQL injection attack, followed by a buffer overflow attack, followed by a default password guess. In this example, the three attacks all target different systems, but all three share a common property, such as a company name, industry, or geography. To hide the attack, the attacker may conduct a "low and slow" reconnaissance and penetration campaign, using anonymization services to generate a wide range of attack sources. Despite the apparent diffusion of the attack across multiple surfaces and multiple sources, this attack may nonetheless be recognized as a synthetic event.

Block 304 accumulates a set of data from multiple sites in an organization across a period of time. Block 306 uses the conditions set in block 302 to determine whether any synthetic events occur, thereby reducing the potentially very large dataset to a tractable number of significant synthetic events. It should be noted that the determination that a synthetic event has occurred may be a binary result or may, alternatively, be a probabilistic determination that provides a likelihood of the event's occurrence. This may depend on the nature of the conditions, as some conditions may not have strict binary outcomes.

Event data collection in block 304 may depend on the specific implementation, but it is contemplated that data collection will involve local generation and processing of event data and that such collection and analysis will be performed pervasively and at different levels of abstraction. For example, it is contemplated that collection is performed at the network level, the system level, and even finer-grained levels of abstraction such as at the operating system level and the application level. Information from each source is sent through one or more tiered levels of central processing which may include, e.g., the level of an individual data center, the country level, the enterprise level, across a set of industry peers, and globally. Exchange of information may be facilitated by internal and public threat exchanges to address synthetic events that occur beyond the scope of an individual system. In this way, data may be aggregated hierarchically, with data from individual sources being collected at a higher level and brought to a central point for consideration before being passed to the next higher level on the hierarchy. When a synthetic event is detected, it is then detected at the lowest level on the hierarchy that has authority over the systems in question. When information is passed farther up the hierarchy, even larger patterns can be detected, for example if a pattern of similar attacks are being performed against a large number of enterprises.

Event detection in block 306 includes matching the set of accumulated data to the set of conditions that define the synthetic event. Detection may be achieved if all of the conditions are met or, alternatively, if some set number of conditions is met. Some conditions may be mandatory, whereas some conditions may be sufficient to trigger the event only in conjunction with other conditions. Some conditions may be probabilistic, where the occurrence of a particular event may not be known with certainty. Synthetic event detection may further include a determination of a score for the synthetic event based on the status of its constituent conditions—some conditions may be weighted more highly than others—with the synthetic event being detected only if the score for the synthetic event exceeds a threshold.

Once a synthetic event has been detected, block 308 determines a severity of the synthetic event and block 310 takes some action. A synthetic event may have a relatively low severity, simply being flagged as an item of interest, or it may have a high severity that either triggers immediate review or an automated security response. It should be noted that the severity of a synthetic event may be magnified if other synthetic events occur in conjunction with it. This response may be non-linear, as the occurrence of multiple synthetic events is much more likely to represent a coordinated attack. The actions taken in block 310 are centralized and do not necessitate the intervention of local security personnel—the response can therefore be focused and encompassing, rather than limited to local sites. Block 310 may determine a course of action based on the severity of the synthetic event and comparing that severity to one or more thresholds.

When determining severity, block 308 uses a type of signal-to-noise determination. For example, for a non-random event to appear out of the random noise, the signal-to-noise ratio is calculated as a function of the square root of the number of events measured. To increase the signal by a factor of 10, the number of events is increased by a factor of 100. To increase the signal by a factor of 100, the number of events is increased by a factor of 10,000. This slow increase leads to a benefit for the use of synthetic events—by making the random occurrence of a synthetic event less likely (i.e., by increasing the number of conditions needed to trigger a synthetic event), the noise factor is decreased. Thus a lower signal is needed to positively identify the occurrence of a synthetic event.

At the most basic level, the response to detection of a synthesized event is to generate an alert, notifying administrators of suspicious activity and allowing the administrators to take defensive action. However, more involved automated responses are also available and may include, for example, redirecting a sample of suspected malware to a malware evaluation service, a sandbox system, or a local threat analyst; automatically configuring the firewall to block a suspected IP address and alert a threat analyst; and injecting false data into a suspicious outbound stream that may be exfiltrating data, where the injected data is falsified or includes a watermark to aid law enforcement in identifying the attackers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
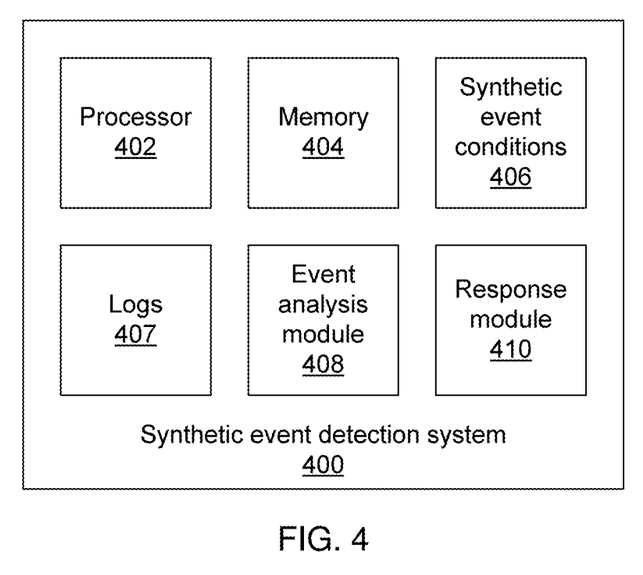
FIG. 4 is a block diagram of a system for event detection in accordance with the present principles.

Referring now to FIG. 4, a system 400 for synthetic event detection is shown. The system 400 includes a hardware processor 402 and a memory 404. It should be understood that other modules in the system may be implemented as software stored in the memory 404 and executed by the processor or may, alternatively, be implemented in hardware as, e.g., application specific integrated chips or field programmable gate arrays. The memory 404 stores a set of synthetic event conditions 406 which define the conditions that will trigger different synthetic events. The memory 404 also stores logs 407 that are gathered from the different sites of the enterprise 100. The logs track information that can be used to recognize attacks, such as service error messages and login failures. An event analysis module 408 reviews the logs 407 to determine whether any of the synthetic event conditions 406 have been met and, if so, determines a severity of the synthetic event. A response module 410 responds to detected synthetic events in a manner that corresponds to the severity of the respective synthetic events.

Figure 5:
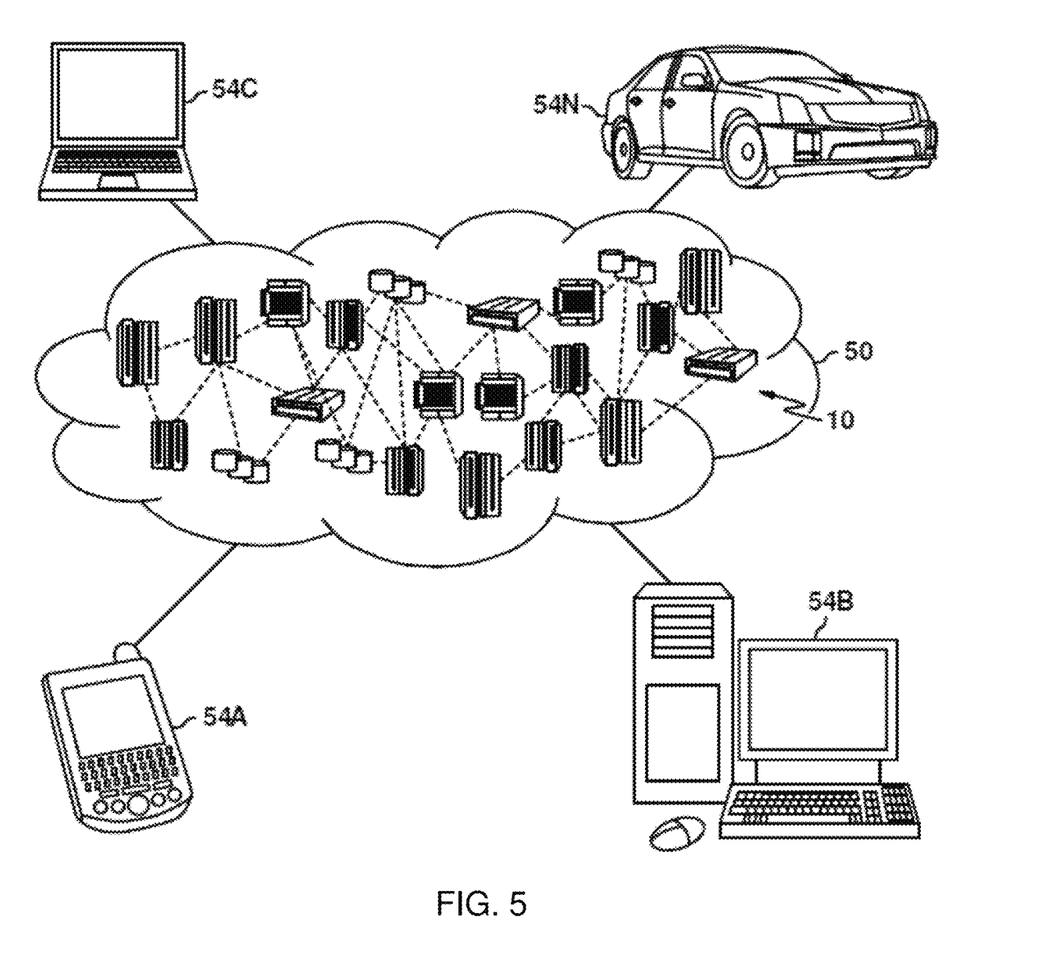
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
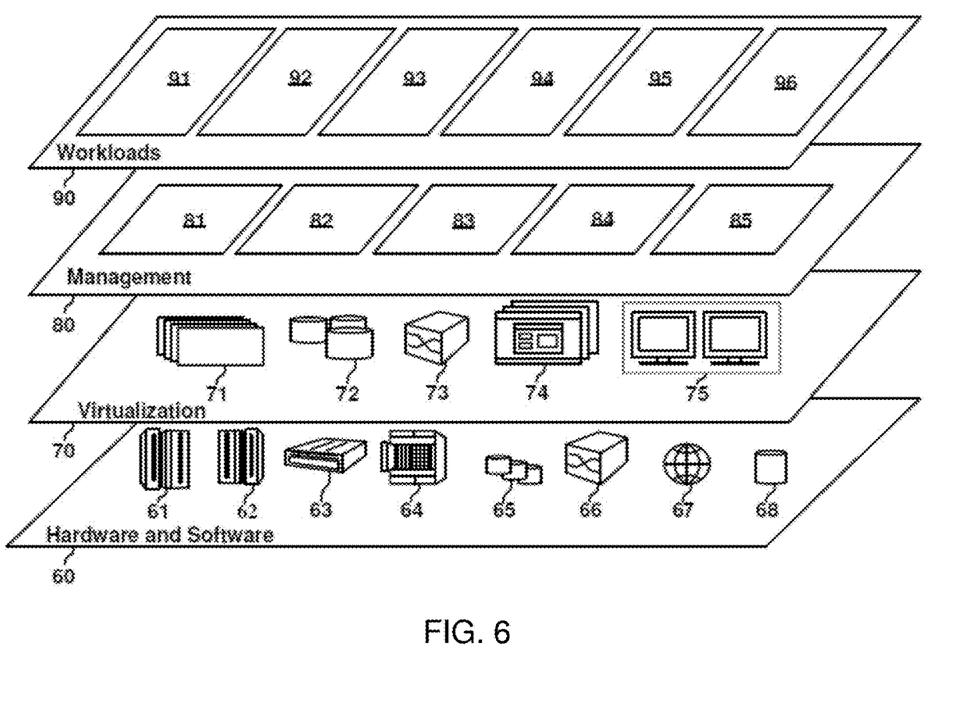
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content shaping 96.

Having described preferred embodiments of a system and method probabilistically detecting low-intensity, multimodal threats using synthetic events (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for event detection, comprising:
defining a plurality of conditions that represent one or more synthetic events, including at least one binary condition and at least one probabilistic condition;
aggregating data from a plurality of data sources in an enterprise computer network across a period of time, multiple attack surfaces, and geographically distinct locations;
matching the aggregated data to the conditions using a hardware processor to determine whether a synthetic event has occurred;
assigning a severity score to the synthetic event; and
automatically responding to the synthetic event by altering an operational parameter of a computer system to resist an attack, taking the severity of the synthetic event into account.

2. The method of claim 1, wherein the severity score depends on a number of other synthetic events that have been detected.

3. The method of claim 2, wherein the severity score increases non-linearly with the number of synthetic events that have been detected.

4. The method of claim 1, wherein responding to the synthetic event comprises providing an alert regarding the attack if the severity score exceeds an alert threshold.

5. The method of claim 1, wherein matching the aggregated data to the conditions comprises calculating a score based on each of the plurality of conditions, wherein a synthetic attack is determined to occur if the calculated score exceeds a detection threshold.

6. The method of claim 1, wherein the plurality of data sources comprises information about news events.

7. The method of claim 1, wherein aggregating data is performed hierarchically, collecting data from individual sources at an intermediate level before aggregating a totality of the data at a central point.

8. A computer readable storage medium comprising a computer readable program for event detection, wherein the computer readable program when executed on a computer causes the computer to perform the steps of:
defining a plurality of conditions that represent one or more synthetic events, including at least one binary condition and at least one probabilistic condition;
aggregating data from a plurality of data sources in an enterprise computer network across a period of time, multiple attack surfaces, and geographically distinct locations;
matching the aggregated data to the conditions using a processor to determine whether a synthetic event has occurred;
assigning a severity score to the synthetic event; and
automatically responding to the synthetic event by altering an operational parameter of a computer system to resist an attack, taking the severity of the synthetic event into account.

9. A system for event detection, comprising:
an event analysis module comprising a hardware processor configured to aggregate data from a plurality of data sources in an enterprise computer network across a period of time, multiple attack surfaces, and geographically distinct locations, to match the aggregated data to a plurality of conditions that represent one or more synthetic events, said conditions including at least one binary condition and at least one probabilistic condition, to determine whether a synthetic event has occurred, and to assign a severity score to the synthetic event; and
a response module configured to automatically respond to the synthetic event by altering an operational parameter of a computer system to resist an attack, based on the severity score of the synthetic event.

10. The system of claim 9, wherein the severity score depends on a number of other synthetic events that have been detected.

11. The system of claim 10, wherein the severity score increases non-linearly with the number of synthetic events that have been detected.

12. The system of claim 9, wherein the response module is further configured to provide an alert regarding the attack if the severity score exceeds an alert threshold.

13. The system of claim 9, wherein the event analysis module is further configured to calculate a score based on each of the plurality of conditions, wherein a synthetic attack is determined to occur if the calculated score exceeds a detection threshold.

14. The system of claim 9, wherein the plurality of data sources comprises information about news events.

15. The system of claim 9, wherein the event analysis module is further configured to aggregate data hierarchically, such that data is collected from individual sources at an intermediate level before a totality of the data is aggregated at a central point.

* * * * *